Aug. 10, 1948.  C. J. BLOM  2,446,521
SUBMERSIBLE MOTOR STRUCTURE
Filed Aug. 2, 1946

Carl J. Blom
INVENTOR

BY Lyon & Lyon
ATTORNEYS

Patented Aug. 10, 1948

2,446,521

UNITED STATES PATENT OFFICE 2,446,521

SUBMERSIBLE MOTOR STRUCTURE

Carl J. Blom, San Marino, Calif., assignor to Byron Jackson Co., Vernon, Calif., a corporation of Delaware Application August 2, 1946, Serial No. 688,001

10 Claims. (Cl. 103—87)

This invention relates to submersible electric motors particularly of the type adapted for use in submersible motorpump units for drilled wells such as water wells.

A principal object of this invention is to provide a submersible electric motor for a motorpump unit embodying an electric motor directly connected in driving relation with a pump and adapted to operate while submerged in the liquid being pumped, and incorporating novel and improved means for protecting the motor from harmful effects of the pump liquid.

It is a further object of this invention to provide a submersible electric motor of the aforementioned type wherein the motor housing is filled with a liquid having no harmful effect on the motor windings and connections, and wherein the liquid in the motor housing is maintained at a higher pressure than the surrounding liquid.

It is a still further object of this invention to provide, in a unit of the foregoing type, a protecting seal chamber isolating the shaft opening in the motor housing from the surrounding liquid, and to provide novel and improved means for equalizing the pressures in the motor housing and the seal chamber and for removing from the seal chamber any external liquid which may possibly leak thereinto.

Figure 1:
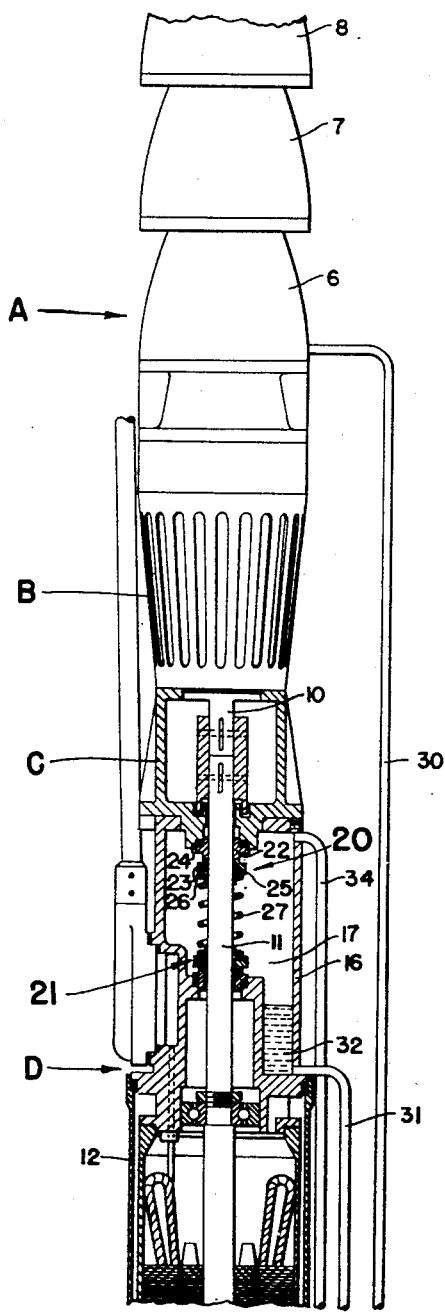
Figure 1A:
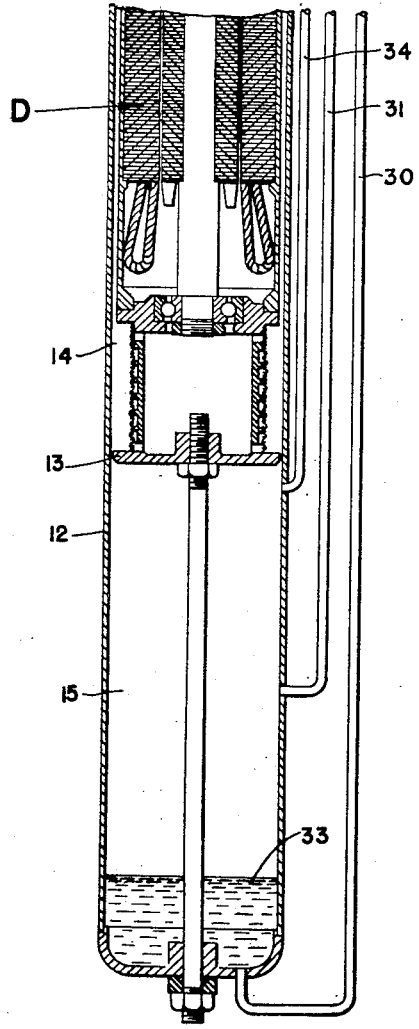

The invention possesses other objects and advantages which will be apparent from the following detailed description of a preferred embodiment thereof, reference being had to the accompanying drawing wherein Figure 1 is a view, partly in longitudinal section and partly in elevation, of the upper portion of the motorpump unit embodying the invention; and Figure 1A is a downward continuation of the structure shown in Figure 1.

Referring to the drawing, the invention is shown as incorporated in a submersible motorpump unit of the type especially adapted to be suspended in a drilled well. A unit of this type comprises generally a multistage pump, only the lower portion of which is shown and designated A, a pump inlet and strainer B, an adapter C, and a submersible electric motor E, all connected in series and suspended from the lower end of a discharge column (not shown). It will be understood that each of the pump bowl units 6, 7, and 8 constitutes a stage of the pump A, and each includes an impeller mounted on a common shaft 10 projecting downwardly into the adapter C where it is connected in driving relation with the rotor shaft 11 of the motor D.

The motor D comprises the usual stator and rotor elements enclosed in a fluid-tight shell 12, which is closed at its lower end and extends downwardly a substantial distance below the motor elements. An imperforate partition 13 forming part of the motor frame structure divides the interior of the shell 12 into a motor compartment 14 and an expansion and pressure-equalizing chamber 15. The shell 12 is sealed at its upper end to a bracket member 16 which includes walls defining a closed seal chamber 17. Both the seal chamber 17 and the shell 12 are preferably filled with a liquid having good dielectric properties and which is of lower specific gravity than the well liquid.

It will be observed that the seal chamber 17 is interposed between the motor compartment 14 and the adapter C, it being understood that when the units is submerged in an external liquid the interior of the adapter will be filled with external liquid at the submergence pressure of such liquid. The juncture of the shaft 11 with the end walls of the seal chamber 17 is sealed by a pair of mechanical seal structures, generally designated 20 and 21, herein shown as of substantially identical construction. Each seal structure comprises a stationary seal ring 22 mounted on an end wall of the seal chamber, and a rotating seal ring 23 mounted on the shaft 11, each ring having a ground and lapped seal face abutting that of the other ring to effect a substantially fluid-tight seal during relative rotation between the rings as well as while the shaft is stationary. A resilient pad 24 is interposed between each stationary seal ring 22 and the corresponding wall of the chamber to provide a self-aligning mounting for the ring and also to effect a fluid-tight seal between the ring and the end wall. Each rotating seal ring 23 is clamped to a resilient packing ring 25 by a cup-shaped metallic ring 26, the packing ring having tight frictional engagement with the shaft to seal the ring to the shaft and also to constrain the packing ring and seal ring to rotate with the shaft. A compression spring 27 is interposed between the rotating seal rings to exert pressure between the abutting seal faces.

It is deemed preferable to maintain a slight pressure differential across the upper seal structure 20 during operation, by subjecting the dielectric liquid within the seal chamber to a slightly higher pressure than that of the external liquid. It has been found that a pressure difference of the order of 15 to 50 pounds per square inch will cause an infinitesimal amount of the internal liquid of the order of one gallon over a period of a year, to migrate radially inwardly between the abutting seal faces during rotation of the shaft. By providing the higher pressure on the internal side of the seal, any leakage between the seal faces will be outward leakage of dielectric liquid rather than inward leakage of external liquid. The dielectric liquid commonly in use has fairly good lubricating properties, and hence this arrangement also reduces friction between the relatively rotatable seal faces and prolongs the useful life of the seal.

In addition to maintaining the liquid in the seal chamber 17 under pressure slightly higher than the external pressure, it is also desirable to subject the dielectric liquid in the motor compartment 14 to the same pressure as that in the seal chamber, in order to balance the pressure across the lower seal structure 21. These objects are accomplished by establishing open communication between the expansion chamber 15 and the discharge side of the first stage 6 of the pump 4, and by connecting the expansion chamber 15 in pressure transfer relation to the seal chamber 17. A conduit 30 is connected at its upper end to the first stage pump bowl 6 at the discharge side of the impeller therein, the lower end of the conduit being connected to the lower end wall of the shell 12. A second conduit 31 is connected at its upper end to the seal chamber 17, its lower end being connected to the expansion chamber 15 at a point substantially midway between the upper and lower extremities of the latter.

Each of the conduits 30 and 31 serves several purposes. The conduit 30 transmits first stage discharge pressure of the pump 4 to the expansion chamber 15 and motor compartment 14, and also provides an outlet from the motor compartment and expansion chamber to permit thermal expansion and contraction of the dielectric liquid due to temperature changes. The conduit 31 not only establishes pressure equilibrium between the motor compartment 14 and the seal chamber 17, but also provides for expansion and contraction of the internal liquid in the seal chamber due to temperature changes, while maintaining pressure equilibrium. It also serves as a drainage conduit through which any external liquid which might leak into the seal chamber may be transferred to the expansion chamber. It will be observed that the seal chamber 17 is provided with a sump portion 32 extending a substantial distance below the lower seal structure 21. The rotation of the shaft and the rotatable seal elements induces rotation of the liquid in the seal chamber, and if any external liquid such as water should enter the seal chamber the centrifugal separating action of the rotating liquid mass will force the particles of heavier external liquid radially outward. Inasmuch as the induced rotation of the liquid varies inversely with the distance from the axis of the shaft, the outer portion of the seal chamber is relatively quiescent and the particles of external liquid will settle into the sump portion 32 and from there will drain downwardly through the conduit 31 into the expansion chamber. The latter is remote from any rotating parts and hence the liquid therein is in a quiescent state. Any external liquid entering this chamber from the conduit 31 will therefore readily settle to the bottom of the chamber, which, under typical operating conditions, usually contains a small amount of external liquid, as indicated by the interface at 33.

The conduit 31 may, if desired, also be used as a passage for transferring dielectric liquid from the expansion chamber 15 upwardly to the seal chamber 17 to compensate for outward leakage of dielectric liquid between the seal faces of the upper seal structure 20. However, in order to further minimize contamination of the dielectric liquid in the seal chamber by external liquid, it is deemed preferable to provide a separate conduit for transferring uncontaminated dielectric liquid from the upper portion of the expansion chamber to the seal chamber. A third conduit 34 may be provided for this purpose, the lower end of which is connected to the upper portion of the expansion chamber 15 and the upper end of which is connected to the upper portion of the seal chamber.

It will be obvious that if no external liquid is present in the seal chamber sump 32 or in the drain conduit 31, upward movement of dielectric liquid to replace leakage from the seal chamber will take place equally in both conduits 31 and 34. But if any external liquid is present in the sump 32 or is in the process of being drained to the expansion chamber through the conduit 31, upward flow will occur only through the conduit 34 because of the greater specific gravity of the mixture of dielectric liquid and external liquid in the conduit 31. The presence of the conduit 34 also tends to accelerate drainage of external liquid from the sump 32, the two conduits 31 and 34 being in effect connected together at their lower ends and constituting a U-tube. The presence of heavier external liquid in one leg of the U-tube (the conduit 31) will induce downward flow on the fluid column in that conduit and upward flow in the conduit 34. The external liquid will in this manner be transferred to the expansion chamber more readily than it would be if the conduit 34 were omitted and vertical interchange of the two liquids took place solely through the conduit 31.

It will be apparent from the foregoing description that a submersible motorpump unit construted in accordance with this invention will operate for a long period of time without requiring replenishment of the supply of dielectric liquid or other servicing. Mechanical seal structures of the type disclosed herein have proven to be capable of successful operation, both intermittent and continuous, for a period of several years under similar operating conditions. The arrangement for maintaining the desired pressure relationship between the bodies of liquid in the various chambers and the external liquid, and for disposing of any external liquid which might leak into the seal chamber so that it is prevented from entering the motor compartment, is extremely simple and yet highly effective.

Although I have shown and described what is now considered a preferred embodiment of the invention, it will be obvious that various changes can be made therein without departing from the spirit of the invention or the scope of the appended claims.

I claim:

1. In a submersible electric motor structure, the combination of: a shell adapted to be immersed in an external liquid and providing a main chamber containing an internal liquid; walls defining a seal chamber above said main chamber and containing internal liquid; a motor in said main chamber and having a shaft extending upwardly through said seal chamber and into the external liquid; a mechanical seal structure surrounding said shaft and sealing said seal chamber from said external liquid; a second mechanical seal structure surrounding said shaft and sealing said seal chamber from said main chamber; pump means driven by said shaft for building up a pressure in said main chamber which is greater than the pressure of the external liquid surrounding said shell; and pressure transfer means communicating with said main chamber and with said seal chamber for equalizing the pressures in said chambers.

2. In a submersible electric motor structure, the combination of: a shell adapted to be immersed in an external liquid and providing a main chamber containing an internal liquid; walls defining a seal chamber above said main chamber and containing internal liquid; a motor in said main chamber and having a shaft extending upwardly through said seal chamber and into the external liquid; a mechanical seal structure surrounding said shaft and sealing said seal chamber from said external liquid; a second mechanical seal structure surrounding said shaft and sealing said seal chamber from said main chamber; pump means driven by said shaft for building up a pressure in said main chamber which is greater than the pressure of the external liquid surrounding said shell; and conduit means communicating with the lower region of the internal liquid in said main chamber and with the lower portion of said seal chamber for equalizing the pressures in said chambers, said conduit means also serving as a drain passage for transferring from said seal chamber to the lower portion of said main chamber any external liquid entering said seal chamber through said first-named seal structure.

3. In a submersible electric motor structure, the combination of: a shell adapted to be immersed in an external liquid and providing a motor chamber and an expansion chamber below the motor chamber, said motor chamber containing an internal liquid and seal expansion chamber containing a body of internal liquid in open communication with the internal liquid in said motor chamber, said expansion chamber also containing a body of external liquid in pressure transfer relation to the internal liquid in said expansion chamber; walls defining a seal chamber above said motor chamber containing internal liquid; a motor in said motor chamber and having a shaft extending upwardly through said seal chamber and into the external liquid; a mechanical seal structure surrounding said shaft and sealing said seal chamber from said external liquid; a second mechanical seal structure surrounding said shaft and sealing said seal chamber from said motor chamber; pump means driven by said shaft; pressure transfer means communicating with the discharge side of said pump means and with the body of external liquid in said expansion chamber whereby the internal liquid in said expansion chamber and in said motor chamber is subjected to a pressure greater than that of the external liquid surrounding said shell; and pressure transfer means communicating with the internal liquid in said expansion chamber and with the interior of said seal chamber whereby the internal liquid in said seal chamber is subjected to said greater pressure.

4. A submersible electric motor structure as set forth in claim 3, wherein said last-named pressure transfer means communicates with the lower portion of said seal chamber and serves as a drain passage for transferring to said expansion chamber any external liquid entering said seal chamber through said first-named seal structure.

5. A submersible electric motor structure as set forth in claim 3, wherein said last-named pressure transfer means communicates with the lower portion of said seal chamber and with the lower portion of the body or internal liquid in said expansion chamber; and other pressure transfer means communicating with the upper portion of said seal chamber and with the upper portion of said expansion chamber.

6. In a submersible electric motor structure, the combination of: walls defining a motor chamber, an expansion chamber therebelow and in open communication therewith, and a seal chamber above the motor chamber, said walls being adapted to be immersed in an external liquid; a motor in said motor chamber and having a shaft extending upwardly through said seal chamber and into the external liquid; mechanical seal structures respectively sealing the juncture of said shaft with each end wall of said seal chamber for sealing said seal chamber from the external liquid and from said motor chamber; an internal liquid filling said seal chamber and said motor chamber and partially filling said expansion chamber; a body of external liquid in said expansion chamber below the internal liquid therein and in pressure transfer relation thereto; pump means driven by said shaft for building up a pressure in said body of external liquid which is higher than the pressure of the external liquid surrounding said walls; and conduit means communicating with said seal chamber and with the internal liquid in said expansion chamber.

7. A submersible electric motor structure as set forth in claim 6, wherein said conduit means communicates with the lower portion of said seal chamber and with the lower portion of the body of internal liquid in said expansion chamber.

8. A submersible electric motor structure as set forth in claim 6, wherein said conduit means communicates with the lower portion of said seal chamber and with the lower portion of the body of internal liquid in said expansion chamber, and including other conduit means communicating with the upper portion of said seal chamber and with the upper portion of the body of internal liquid in said expansion chamber.

9. A submersible electric motor structure as set forth in claim 6, wherein said mechanical seal structures are of the semi-effective type, and wherein said conduit means serves as a drain passage for transferring from said seal chamber to said expansion chamber any external liquid entering said seal chamber through said first-named seal structure.

10. A submersible electric motor structure comprising, in combination: walls defining a motor chamber, an expansion chamber therebelow and in open communication therewith, and a seal chamber above said motor chamber; an internal liquid filling said motor chamber and seal chamber and substantially filling said expansion chamber; said walls being adapted to be immersed in an external liquid of greater specific gravity than said internal liquid; a body of external liquid in said expansion chamber below the internal liquid therein and in pressure transfer relation thereto; a motor in said motor chamber and having a shaft extending upwardly through said seal chamber and into the external liquid; sealing means around said shaft at its juncture with the walls of said seal chamber for sealing said seal chamber from the external liquid and from the motor chamber; pump means driven by said shaft for building up a pressure in said body of external liquid in said expansion chamber, which pressure is greater than the pressure of the external liquid surrounding said walls; a sump in the lower portion of said seal chamber into which any external liquid entering said seal chamber may settle by gravity; a conduit communicating with said sump and with the lower portion of the body of internal liquid in said expansion chamber, whereby external liquid in said sump will drain to said expansion chamber and settle by gravity into the body of external liquid in said expansion chamber; and other conduit means communicating with the upper portion of said seal chamber and with the upper portion of said expansion chamber, said two conduit means forming a U-tube and accelerating drainage of external liquid through said first-named conduit means.

CARL J. BLOM.

Certificate of Correction

Patent No. 2,446,521.

August 10, 1948.

CARL J. BLOM

It is hereby certified that errors appear in the printed specification of the above numbered patent requiring correction as follows: Column 2, line 21, for the word "units" read *unit*; column 5, line 44, claim 3, for "seal" read *said*; column 6, line 9, claim 5, for "body or" read *body of*; and that the said Letters Patent should be read with these corrections therein that the same may conform to the record of the case in the Patent Office.

Signed and sealed this 23rd day of November, A. D. 1948.

[SEAL]

THOMAS F. MURPHY,
*Assistant Commissioner of Patents.*